United States Patent
Hong et al.

(10) Patent No.: US 12,108,513 B2
(45) Date of Patent: Oct. 1, 2024

(54) HEATING SYSTEM AND HEATING ELEMENT

(71) Applicants: SEOUL NATIONAL UNIVERSITY R&DB FOUNDATION, Seoul (KR); GRAPHENE SQUARE INC., Seoul (KR)

(72) Inventors: Byung Hee Hong, Gyeonggi-do (KR); Sang Min Kang, Seoul (KR); Young Soo Kim, Seoul (KR)

(73) Assignees: SEOUL NATIONAL UNIVERSITY R&DB FOUNDATION, Seoul (KR); GRAPHENE SQUARE INC., Seoul (KR)

(*) Notice: Subject to any disclaimer, the term of this patent is extended or adjusted under 35 U.S.C. 154(b) by 1345 days.

(21) Appl. No.: 16/489,419

(22) PCT Filed: Aug. 14, 2017

(86) PCT No.: PCT/KR2017/008848
§ 371 (c)(1),
(2) Date: Mar. 3, 2020

(87) PCT Pub. No.: WO2018/159909
PCT Pub. Date: Sep. 7, 2018

(65) Prior Publication Data
US 2020/0374993 A1    Nov. 26, 2020

(30) Foreign Application Priority Data
Feb. 28, 2017  (KR) ........................ 10-2017-0026772

(51) Int. Cl.
*H05B 6/64* (2006.01)
*C01B 32/194* (2017.01)
*C01B 32/198* (2017.01)

(52) U.S. Cl.
CPC ......... *H05B 6/6491* (2013.01); *C01B 32/194* (2017.08); *C01B 32/198* (2017.08);
(Continued)

(58) Field of Classification Search
CPC .. H05B 6/6491; H05B 6/6494; H05B 6/6497; C01B 32/182–198
See application file for complete search history.

(56) References Cited

U.S. PATENT DOCUMENTS 5,977,529 A * 11/1999 Willert-Porada ...... H05B 6/782
219/752
2010/0264356 A1* 10/2010 Cook .................. B29C 35/0805
252/511

(Continued)

FOREIGN PATENT DOCUMENTS

JP     2013101808 A    5/2013
JP     2014-012921 A   1/2014

(Continued)

OTHER PUBLICATIONS

WO 2009/081968 A1 (Honda, Makoto et al.) Jul. 2, 2009 [retrieved Feb. 23, 2024]. Retrieved from Foreign Image and Text database, translation by Clarivate Analytics. (Year: 2009).*

(Continued)

*Primary Examiner* — John J Norton
(74) *Attorney, Agent, or Firm* — Dilworth IP, LLC

(57) ABSTRACT

The present specification provides a heating system including: a heating unit including a substrate and a heating layer provided on the substrate and including graphene; an electromagnetic wave irradiation unit configured to irradiate at least one region of the heating unit with electromagnetic waves; and a control unit configured to control an operation (Continued)

of the electromagnetic wave irradiation unit, wherein the heating layer emits heat by absorbing the electromagnetic waves.

11 Claims, 6 Drawing Sheets

(52) U.S. Cl.
CPC ...... *C01B 2204/02* (2013.01); *C01B 2204/22* (2013.01); *H05B 2214/04* (2013.01)

(56) References Cited

U.S. PATENT DOCUMENTS

| | | | |
|---|---|---|---|
| 2012/0055100 A1* | 3/2012 | Yamazoe | B24D 3/06 425/78 |
| 2012/0250905 A1 | 10/2012 | Jiang et al. | |
| 2014/0021195 A1* | 1/2014 | Kim | H05B 3/84 219/553 |
| 2015/0083046 A1* | 3/2015 | Ranish | C23C 16/4585 118/724 |
| 2016/0255184 A1 | 9/2016 | Hwang | |
| 2016/0372622 A1 | 12/2016 | Fong et al. | |

FOREIGN PATENT DOCUMENTS

| | | | | |
|---|---|---|---|---|
| JP | 2014-146478 | A | 8/2014 | |
| JP | 2014-210675 | A | 11/2014 | |
| JP | 2016047777 | A | 4/2016 | |
| JP | 2022-037075 | A | 3/2022 | |
| KR | 1020020046342 | | 6/2002 | |
| KR | 1020110016287 | | 2/2011 | |
| KR | 1020110093735 | | 8/2011 | |
| KR | 101424089 | B | 7/2014 | |
| WO | WO-2009081968 | A1 * | 7/2009 | ....... H01L 21/02554 |
| WO | 2016091882 | A | 6/2016 | |

OTHER PUBLICATIONS

Kang, S. et al; Efficient heat generation in large-area graphene films by electromagnetic wave absorption; IOP Publishing; 2017; pp. 1-7.
Office Action from JPO Application No. 2019-548067 dated Nov. 9, 2020, 4 pages.

* cited by examiner

HEATING SYSTEM AND HEATING ELEMENT

TECHNICAL FIELD

The present disclosure relates to a heating system and a heating element.

BACKGROUND ART

Recently, development and application on planar heating elements that generate heat using the self-resistance of carbon have been actively made. Such carbon-based planar heating elements are easily controlled in their temperature, do not contaminate air, are hygienic and noiseless, and emit far infrared rays beneficial to the human body. Due to such characteristics, these planar heating elements are widely used as heating elements for residential heating purposes, as well as commercial heating, agricultural heating and various industrial heating purposes.

Furthermore, heating elements based on graphene sheets have also been actively studied, which are limited to using Joule heating caused by the internal resistance of the graphene sheets. The graphene sheet heating elements using Joule heating caused by the internal resistance of the graphene sheets have a limitation in that it is difficult to ensure heating uniformity, due to a limitation in lowering the sheet resistance of the graphene sheets. Furthermore, a problem arises in that it is difficult to increase the heating rate and heating efficiency of these heating elements. In addition, a problem also arises in that, since metal electrodes need to be used to supply power to the heating elements, portions provided with the electrodes do not ensure transparency. In particular, difficulty in manufacturing may occur due to the poor flexibility of the electrodes during curved surface processing of the heating elements.

DISCLOSURE

Technical Problem

The present disclosure intends to provide a heating system and a heating element, which use graphene.

However, problems to be solved by the present disclosure are not limited to the above-mentioned problem, and other problems which are not mentioned will be clearly understood by those skilled in the art from the following description.

Technical Solution

One embodiment of the present disclosure provides a heating system including: a heating unit including a substrate and a heating layer provided on the substrate and including graphene; an electromagnetic wave irradiation unit configured to irradiate at least one region of the heating unit with electromagnetic waves; and a control unit configured to control an operation of the electromagnetic wave irradiation unit, wherein the heating layer emits heat by absorbing the electromagnetic waves.

Another embodiment of the present disclosure provides a heating element including: a substrate; and a heating layer provided on the substrate and including graphene, wherein the heating layer emits heat by absorbing electromagnetic waves.

Advantageous Effects

The heating system according to one embodiment of the present disclosure may emit heat without including a separate electrode in the heating unit, and thus has an advantage in that the ease of producing the heating unit is excellent.

The heating system according to one embodiment of the present disclosure has advantages in that a high heating rate is achieved and a time required for the temperature of the heating unit to reach a saturation temperature is short.

According to one embodiment of the present disclosure, there are advantages in that the heating unit has excellent light transmittance and curved surface processing of the heating unit is easy.

The heating system according to one embodiment of the present disclosure has an advantage in that equal heating efficiency may be achieved using lower power consumption than a heating system that generates heat by Joule heating.

BEST MODE

Figure 1:
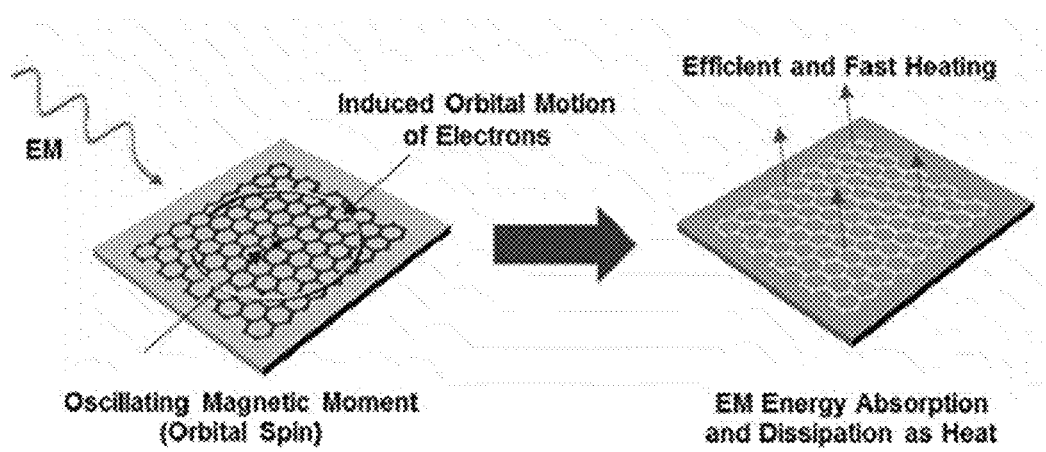
FIG. 1 schematically illustrates the heating phenomenon of a heating layer in a heating system according to one embodiment of the present disclosure.

Throughout the present specification, when any member is referred to as being "on" another member, it not only refers to a case where any member is in contact with another member, but also a case where a third member exists between the two members.

Throughout the present specification, it is to be understood that, when any part is referred to as "including" any component, it does not exclude other components, but may further include other components, unless otherwise specified.

Hereinafter, the present specification will be described in more detail.

One embodiment of the present disclosure provides a heating system including: a heating unit including a substrate and a heating layer provided on the substrate and including graphene; an electromagnetic wave irradiation unit configured to irradiate at least one region of the heating unit with electromagnetic waves; and a control unit configured to control an operation of the electromagnetic wave irradiation unit, wherein the heating layer emits heat by absorbing the electromagnetic waves.

Another embodiment of the present disclosure provides a heating element including: a substrate; and a heating layer provided on the substrate and including graphene, wherein the heating layer emits heat by absorbing electromagnetic waves.

The heating element according to one embodiment of the present specification may be the same as the heating unit of the heating system. In addition, the configurations of the substrate and heating layer of the heating element according to one embodiment of the present specification may be the same as the configuration of the heating unit of the heating system.

According to one embodiment of the present disclosure, the substrate may refer to a support on which the heating layer is to be provided. In addition, the substrate may sometimes be a member itself that requires heating. In this case, the heating layer may be provided on the member itself that requires heating. For example, specifically, in the case of car glass that requires heating, the substrate may be car glass itself, and in this case, the heating layer may be provided on the car glass. Alternatively, the heating unit may be produced by providing the heating layer on a separate substrate, and then may be affixed to car glass.

According to one embodiment of the present disclosure, the substrate may be a transparent substrate. Furthermore, the substrate may be a flexible substrate. Specifically, the average light transmittance of the substrate in the visible wavelength region may be 80% or more or 85% or more, more specifically, 90% or more.

In addition, the substrate may be a glass substrate, a polymer substrate or a silicon-based substrate. The polymer substrate may be a substrate including one or more selected from the group consisting of PET (polyethylene terephthalate), PMMA (poly(methyl methacrylate)), PVDF (poly(vinylidene fluoride)) and PANI (polyaniline).

According to one embodiment of the present disclosure, the graphene may include one or more selected from the group consisting of graphene oxide, reduced graphene oxide, graphene sheets, and graphene flakes. However, the graphene is not limited thereto, and may include graphene nanostructures or graphene derivatives, which include graphene.

According to one embodiment of the present disclosure, the heating layer may include a graphene sheet provided on the substrate, and may further include at least one of graphene oxide, reduced graphene oxide, and graphene flakes.

According to one embodiment of the present disclosure, the heating layer may generate heat by the charge transport in the graphene in a diamagnetic state, which is induced by absorbing the electromagnetic waves. Specifically, diamagnetism of the graphene may be induced by absorbing the electromagnetic waves irradiated from the electromagnetic wave irradiation unit, and the absorbed electromagnetic waves may induce the orbital spin of charges in the graphene, thereby enabling heat generation. The heating layer may also exhibit Joule heating by an induced current caused by irradiation of the electromagnetic waves. However, the Joule heating phenomenon caused by the induced current is not the main heating effect of the heating layer, and may be insignificant compared to the heating caused by the charge transport induced by absorption of the electromagnetic waves.

Namely, the heating unit of the heating system according to one embodiment of the present disclosure generates heat using charge mobility caused by absorption of the electromagnetic waves, rather than generating heat using resistance depending on the electrical conductivity of the heating layer, like conventional Joule heating.

FIG. 1 schematically illustrates the heating phenomenon of the heating layer in the heating system according to one embodiment of the present disclosure. Specifically, referring to FIG. 1, the center of the graphene sheet of the heating layer is irradiated with electromagnetic waves (EM) emitted from an electromagnetic wave irradiation unit(not illustrated). In one region of the graphene sheet that absorbed the electromagnetic waves, magnetic moment oscillation caused by the orbital spin of charges occurs. The magnetic moment oscillation spreads to the periphery of the graphene sheet. In this way, fast and efficient heating of the heating layer may be achieved.

The "graphene sheet" in the present specification refers to a graphene layer or sheet formed of polycyclic aromatic molecules in which a plurality of carbon atoms are connected together by covalent bonds. The carbon atoms connected together by covalent bonds may form a six-membered ring as a basic repeating unit, but the graphene sheet may further contain a five-membered ring and/or a seven-membered ring. Thus, the graphene sheet appears as a single layer of carbon atoms connected together by covalent bonds (usually $sp^2$ bonds). The graphene sheet may have various structures, and such structures may vary depending on the content of a five-membered ring and/or a seven-membered ring, which may be contained in the graphene. The graphene sheet may be composed of a single layer of the graphene as described above. However, several layers of the graphene may also be stacked on one another to form a plurality of layers. Generally, the lateral ends of the graphene may be saturated with hydrogen atoms.

According to one embodiment of the present disclosure, the graphene sheet may be a monolayered graphene sheet or a multilayered grapheme sheet.

According to one embodiment of the present disclosure, the graphene sheet may be a graphene sheet having 1 to 10 layers. Specifically, according to one embodiment of the present disclosure, the graphene sheet may include a graphene sheet having 3 to 8 layers, more specifically, a graphene sheet having 4 to 6 layers.

When the graphene sheet is formed to have graphene layers within the above-described range, there are advantages in that the diamagnetism of the graphene sheet may be enhanced, thus inducing the fast temperature rise and high temperature uniformity of the heating unit, and in that the light transmittance of the heating unit may be ensured. If the heating unit includes a graphene sheet having more than 10 layers, the increase in advantages by temperature rise and an increase in temperature uniformity may be insignificant, and the production cost may be increased. In addition, if the heating unit includes a graphene sheet having more than 10 layers, the light transmittance of the heating unit may be reduced, and thus the heating unit may not function as a transparent heating unit. However, the number of layers in the graphene sheet is not limited within the above-described range and may be adjusted depending on the intended use. For example, for use as a transparent heating unit, the number of layers in the graphene sheet may be adjusted to 10 or less, thereby controlling the light transmittance and heating efficiency of the heating unit. In addition, for use as an opaque heating unit that requires high heating efficiency, the number of layers in the graphene sheet may be adjusted to 10 or more.

According to one embodiment of the present disclosure, the graphene sheet may be formed by a known method. Specifically, according to one embodiment of the present disclosure, the graphene sheet may be formed using chemical vapor deposition, specifically, rapid thermal chemical vapor deposition (RTCVD), inductively coupled plasma-chemical vapor deposition (ICP-CVD), low-pressure chemical vapor deposition (LPCVD), atmospheric-pressure chemical vapor deposition (APCVD), metal organic chemical vapor deposition (MOCVD), or plasma-enhanced chemical vapor deposition (PECVD).

In addition, the graphene sheet may be formed under atmospheric pressure, low pressure or vacuum. Specifically, when the step of forming the graphene sheet is performed under an atmospheric pressure condition, damage to the graphene, which is caused by collision with heavy argon (Ar) gas at high temperature, may be minimized by using helium (He) or the like as a carrier gas. In addition, when the step of forming the graphene sheet is performed under an atmospheric pressure condition, there is an advantage in that the graphene sheet may be produced by a simple process at low costs. Furthermore, when the step of forming the graphene sheet is performed under a low pressure or vacuum condition, a high-quality graphene sheet may be synthesized by reducing the oxidized surface of a metal catalyst by treatment at elevated temperature while using hydrogen as an atmospheric gas.

According to one embodiment of the present disclosure, the graphene sheet may be formed by placing in a tubular furnace a thin film or foil-type metallic graphene growth support in a roll form and supplying a reaction gas containing a carbon source, followed by heat treatment at atmospheric pressure. Specifically, when the carbon source is heat-treated at a temperature of 300° C. to 2000° C. while being supplied in the vapor phase, a graphene sheet having a hexagonal plate-like structure may be formed by the bonding of carbon components present in the carbon source.

In addition, according to one embodiment of the present disclosure, the graphene sheet may be formed as a multi-layered graphene sheet by repeatedly forming a monolayered graphene sheet.

According to one embodiment of the present disclosure, the electromagnetic waves may be irradiated from the electromagnetic wave irradiation unit to at least one region of the heating unit. Specifically, the electromagnetic waves may be irradiated to at least one region of the heating layer. The electromagnetic waves may be irradiated directly to the heating layer, or may also be irradiated to the substrate and may reach the heating layer after passing through the substrate.

As mentioned above, the heating layer of the heating system according to one embodiment of the present disclosure does not use resistance depending on electrical conductivity, but uses the motion of charges in the graphene, which is caused by absorption of the electromagnetic waves. Thus, even when a portion of the heating layer is irradiated with the electromagnetic waves, the motion of charges in the graphene may spread to the periphery of the heating layer, and thus heat generation may occur throughout the heating layer.

To further shorten a time required for the temperature of the heating unit to reach the saturation temperature, a region of the heating layer, which is irradiated with the electromagnetic waves, may be enlarged, and the size of this region may be adjusted depending on the intended use of the heating unit.

According to one embodiment of the present disclosure, the electromagnetic wave irradiation unit may be used without limitation as long as it is a means capable of irradiating the heating unit with the electromagnetic waves. The electromagnetic wave irradiation unit may be located to be spaced apart from the heating unit, and may not be in direct contact with the heating unit.

According to one embodiment of the present disclosure, the electromagnetic wave irradiation unit may irradiate the heating unit with electromagnetic waves having a frequency of 1 MHz to 100 GHz.

According to one embodiment of the present disclosure, the control unit may control an operation of the electromagnetic wave irradiation unit. Specifically, the control unit may serve to supply power from an external power source to the electromagnetic wave irradiation unit or cut off power supply to the electromagnetic wave irradiation unit, and furthermore, may serve to control the output of the electromagnetic wave irradiation unit. Specifically, the control unit may control the heating rate of the heating unit by controlling the frequency and output of the electromagnetic waves irradiated from the electromagnetic wave irradiation unit.

According to one embodiment of the present disclosure, the heating unit may further include a self-assembled monolayer (SAM) provided between the substrate and the heating layer.

The self-assembled monolayer may serve to control the charge mobility in the graphene, thereby controlling the heating rate and temperature uniformity of the heating layer. Specifically, the self-assembled monolayer enables the Dirac-voltage of the graphene to shift close to 0, thereby increasing the charge mobility in the graphene, resulting in an increase in the efficiency of heating caused by absorption of the electromagnetic waves.

The self-assembled monolayer may refer to an organic monolayer which is spontaneously formed on a solid surface, for example, a substrate. The structure of molecules which are used to form the organic monolayer may be divided into a head group, an alkyl chain and a terminal group.

The self-assembled monolayer may be made by adsorbing some of the constituent molecules onto the substrate surface and, at the same time, forming a supramolecular assembly by the interaction between the molecules. In addition, the self-assembled monolayer may be formed from a solution phase or a gas phase.

According to one embodiment of the present disclosure, the self-assembled monolayer may be a self-assembled monolayer (SAM) of alkylsiloxanes, a self-assembled monolayer (SAM) of alkanethiols, a self-assembled monolayer (SAM) of alkyl, a self-assembled monolayer (SAM) of alkanephosphonic acid, or a self-assembled monolayer (SAM) of 3,4-dihydroxyphenylethylamine.

Specifically, according to one embodiment of the present disclosure, the self-assembled monolayer may be a self-assembled monolayer (SAM) of alkylsiloxanes, more specifically, a self-assembled monolayer (SAM) of γ-aminopropyltriethoxysilane (APS) or a self-assembled monolayer (SAM) of octadecyltrichlorosilane (OTS).

According to one embodiment of the present disclosure, the average light transmittance of the heating unit at a visible wavelength may be 80% to 95%. In addition, the light transmittance of the heating unit at a wavelength of 550 nm may be 80% to 95%. Specifically, the average light transmittance of the heating unit in the visible wavelength region may be 80% or more or 85% or more and 95% or less or 90% or less.

According to one embodiment of the present disclosure, the heating unit may include no separate electrode. Specifically, since the heating system according to one embodiment of the present disclosure does not use the resistance of the heating unit, it may not include a metal electrode for applying a voltage to the heating unit. Accordingly, there are advantages in that transparency may be ensured throughout the heating unit by eliminating an opaque portion caused by an electrode, and in that the heating unit may be easily processed into a desired shape such as a curved surface shape, since it is not necessary to process a metal electrode.

According to one embodiment of the present disclosure, the temperature uniformity of the heating layer at the saturation temperature may be 60% or more. Specifically, the temperature uniformity of the heating layer at the saturation temperature may be 60% to 90%.

The temperature uniformity of the heating layer at the saturation temperature may be calculated by quantifying the pixels of an image photographed by a thermal imaging camera using a Matlab program.

The saturation temperature in the present specification may mean a temperature measured when the temperature of the heating layer no longer increases and is maintained at a constant temperature. For example, the saturation temperature may mean a temperature measured when the temperature of the heating layer no longer increases after the electromagnetic waves are irradiated to the heating layer.

According to one embodiment of the present disclosure, a time required for the temperature of the heating layer to reach the saturation temperature may be within 40 seconds in an area of 9 cm×9 cm. Specifically, according to one embodiment of the present disclosure, a time required for the temperature of the heating element to reach the saturation temperature may be within 30 seconds or within 20 seconds in an area of 9 cm×9 cm.

Since the heating unit does not use the electrical resistance of the heating layer, it may exhibit high temperature uniformity. In the case of a heating element that uses the resistance of an electrical conductor, like Joule heating, there is a problem in that, since a current flows toward a low-resistance region, it is very difficult to achieve a uniform temperature distribution. However, since the heating unit of the heating system according to the present disclosure uses the charge mobility in the graphene, which is caused by absorption of the electromagnetic waves, it has advantages in that a time required to reach the saturation temperature is very short and the temperature uniformity at the saturation temperature is also excellent.

According to one embodiment of the present disclosure, the heating system may be applied instead of a conventional heating element, and has an advantage in that it may generate heat with high efficiency using lower power. Furthermore, the heating system may be produced to have a large area and a plane structure, and may be used in various fields, including glass plates for use in cars, ships, airplanes, etc., road traffic signs in mountainous areas, mirrors for securing a viewing angle, military equipment screens, ski goggles, glass walls for use in buildings, indoor glasses, etc. In addition, it may be used as a means for preventing frost from forming on glass in winter or for defogging. Specifically, the heating system may be applied to car glass to remove frost, and may be applied to electronic products vulnerable to moisture to lower humidity.

Mode for Invention

Hereinafter, the present disclosure will be described in detail with reference to examples. However, the examples according to the present disclosure may be modified into various different forms, and the scope of the present disclosure is not interpreted as being limited to the examples described below. The examples of the present specification are provided to more completely explain the present disclosure to those skilled in the art.

EXAMPLE 1

A 25 μm-thick copper foil (Alfa Aesar, 99.99%) was loaded into a chemical vapor deposition apparatus, and then 70 mTorr and 4 sccm or less of $H_2$ gas and 650 mTorr and 35 sccm or less of $CH_4$ gas were supplied in an atmosphere of 1,000° C., thereby forming a monolayered graphene sheet. A pressure-sensitive adhesive film (PSAF) was attached onto the produced graphene sheet, and then the copper foil was removed by etching with a 0.1 M ammonium sulfate solution, and the remaining material was washed with distilled water and then dried. Furthermore, the graphene sheet was transferred onto a quartz glass substrate, and the pressure-sensitive adhesive film was removed, thereby producing a heating unit in which the monolayered graphene sheet was provided on the glass substrate. Furthermore, the process of transferring the graphene sheet was repeated, thereby producing heating units in which each of bi- to tetra-layered graphene sheets was provided on the glass substrate.

Furthermore, for electromagnetic wave irradiation, a microwave oven was prepared, which emits a frequency of 2.45 GHz and has an output of 50 W to 700 W.

Figure 2:
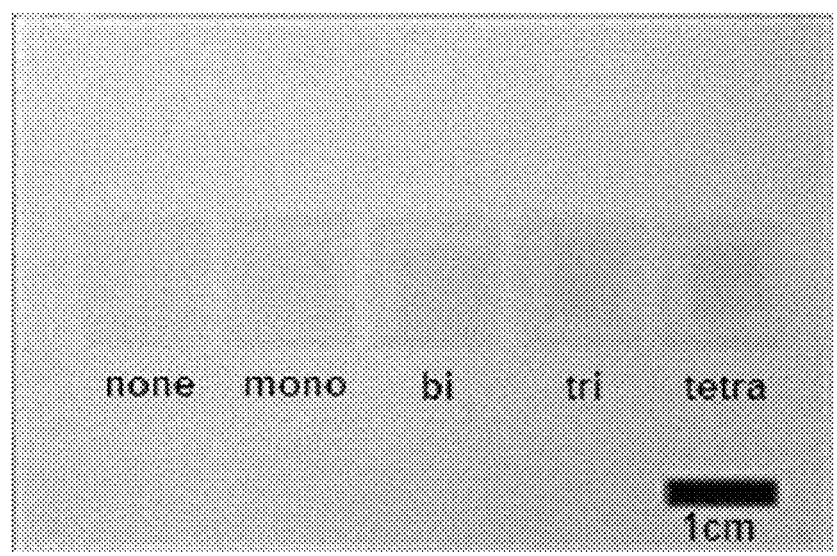
FIG. 2 illustrates each heating unit produced according to Example 1.

FIG. 2 illustrates each heating unit produced according to Example 1. Specifically, FIG. 2 illustrates quartz glass having no graphene sheet (none), a heating unit including a monolayered graphene sheet (mono), a heating unit including a bilayered graphene sheet (bi), a heating unit including a trilayered graphene sheet (tri), and a heating unit including a tetralayered graphene sheet (tetra). Referring to FIG. 2, it can be seen that even the light transmittance of the heating unit having the tetralayered graphene sheet (tetra) is not significantly reduced compared to that of the quartz glass substrate having no graphene sheet (none) and is maintained.

TEST EXAMPLE 1

Each of the heating units produced in Example 1 above was irradiated with electromagnetic waves from the microwave oven at a frequency of 2.45 GHz and an output of 70 W for 10 seconds, and then the temperature distributions of the heating units were measured using an infrared camera (FLIR T650sc).

Figure 3:
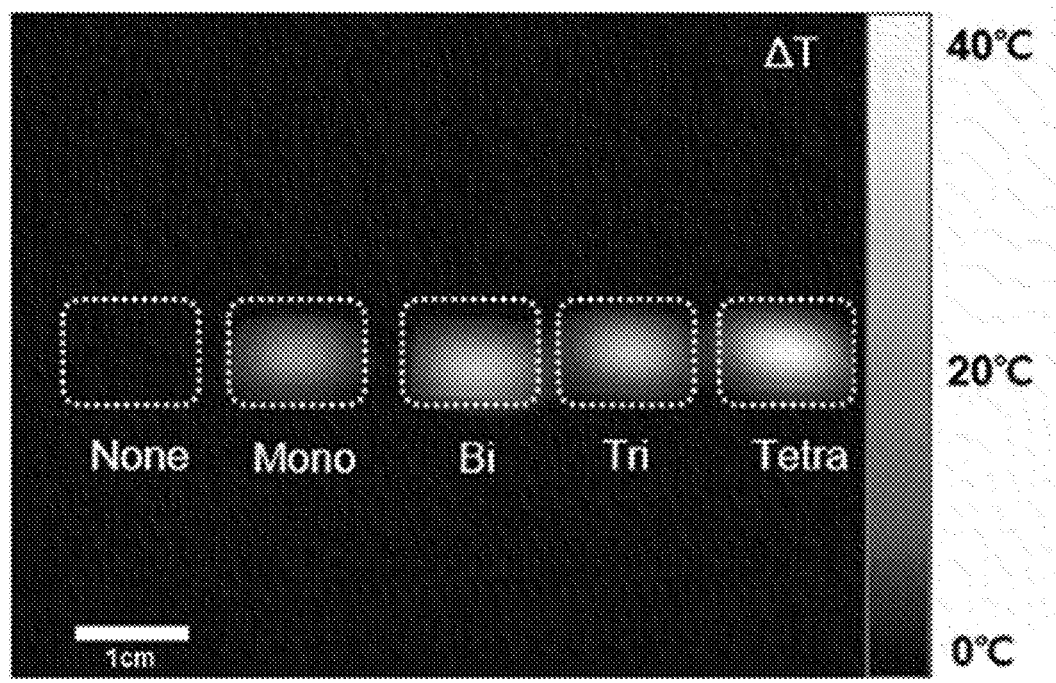
FIG. 3 shows the temperature distribution of each heating unit, measured according to Test Example 1.

FIG. 3 shows the temperature distribution of each heating unit, measured according to Test Example 1. Referring to FIG. 3, it can be seen that there was no temperature change in the quartz glass substrate having no graphene sheet stacked thereon (none), and the temperature rise was faster as the number of stacked layers in the graphene sheet increased.

It can be seen that, as the number of layers in the graphene sheet of the heating unit according to the present disclosure increases, the heating efficiency of the heating unit increases, but the light transmittance thereof tends to decrease. Therefore, the temperature rise rate and heating efficiency of the heating unit may be controlled by adjusting the number of layers in the graphene sheet in consideration of the light transmittance suitable for the intended use.

Figure 4:
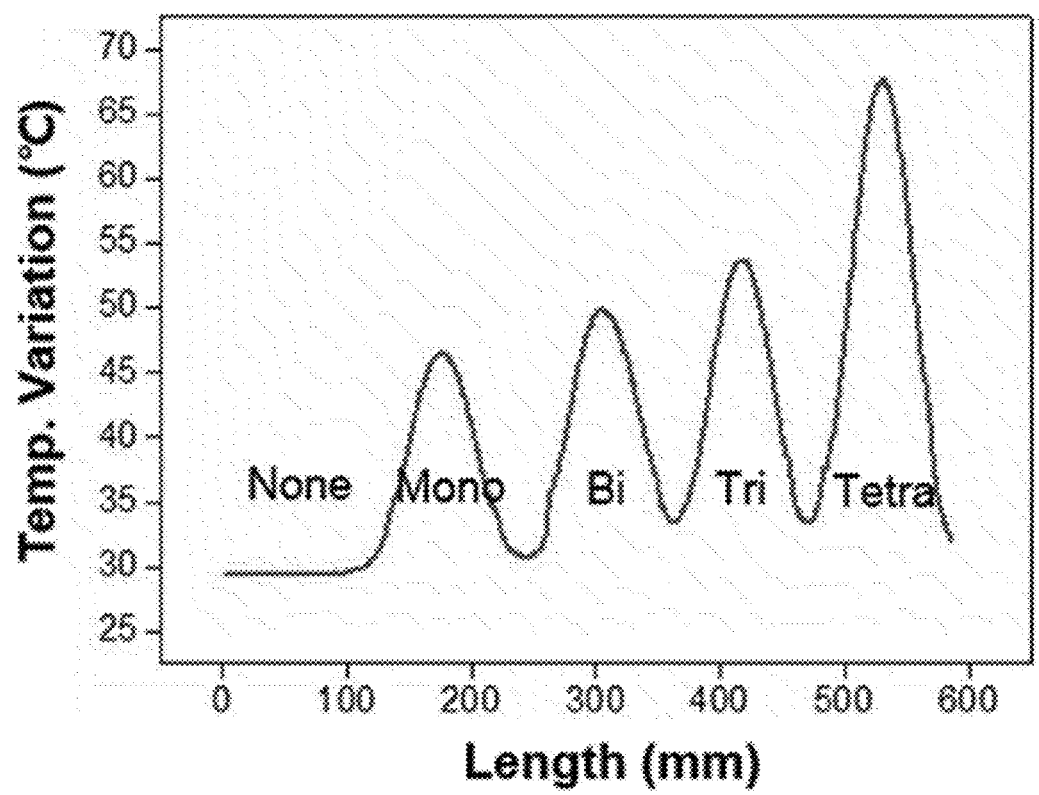
FIG. 4 shows the temperature variation of each heating unit, measured according to Test Example 1.

FIG. 4 shows the temperature variation of each heating unit, measured according to Test Example 1. Specifically, the horizontal axis of FIG. 4 denotes the distance resulting from the arrangement of the samples in FIG. 3, and the vertical axis thereof denotes the temperature variation of the sample corresponding to each position. FIG. 4 shows the temperature variation of each of the quartz glass having no graphene sheet (none), the heating unit including the monolayered graphene sheet (mono), the heating unit including the bilayered graphene sheet (bi), the heating unit including the trilayered graphene sheet (tri), and the heating unit including the tetralayered graphene sheet (tetra). It can be seen that as the number of layers in the graphene sheet increases, the extent of the temperature variation increases.

COMPARATIVE EXAMPLE 1

Joule heating elements were produced by providing each of mono- to tetra-layered graphene sheets on a quartz glass substrate according to the method of Example 1, forming a copper electrode having a thickness of 1 μm and a width of 7 cm on both ends of each of the graphene sheets, and then connecting a power source to the copper electrodes.

TEST EXAMPLE 2

The heating unit including a tetralayered graphene sheet, produced according to the method of Example 1, and a microwave oven for electromagnetic wave irradiation were prepared, and then the heating unit was irradiated with electromagnetic waves at a frequency of 2.45 GHz and an output of 70 W for 160 seconds. Furthermore, a current was supplied to the copper electrodes of the Joule heating element including the tetralayered graphene sheet, produced in Comparative Example 1, at a power of 70 W, thereby inducing the Joule heating of the graphene sheet.

Figure 5:
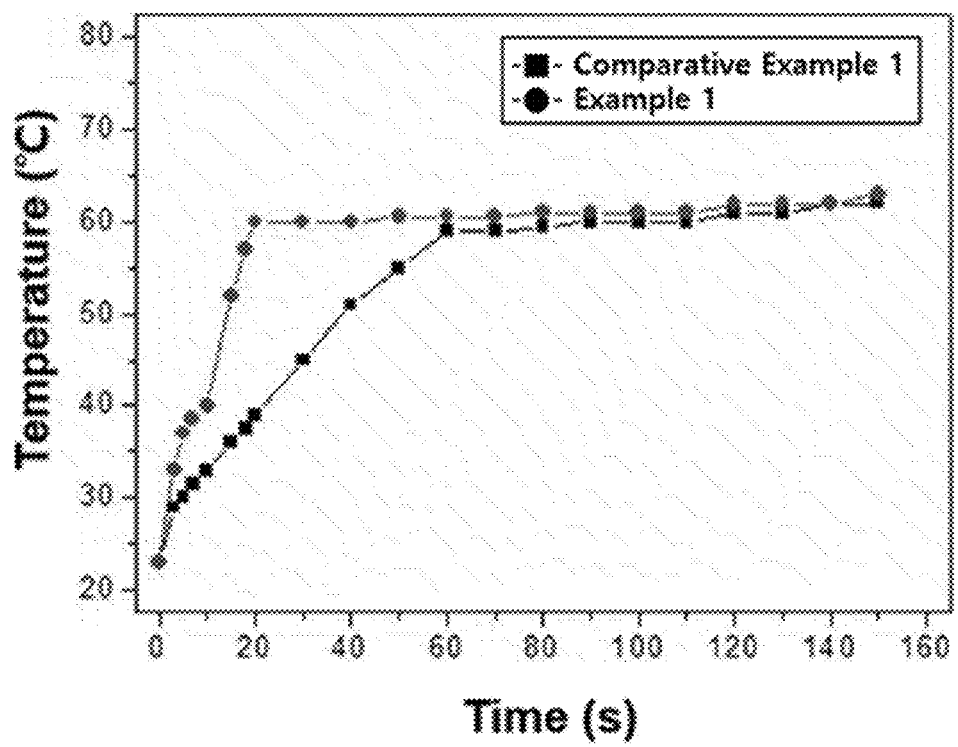
FIG. 5 is a graph showing the results of measuring a time required for the temperature of each of a heating unit of Example 1 and a heating unit of Comparative Example 1 to reach a saturation temperature, according to Test Example 2.

FIG. 5 is a graph showing the results of measuring a time required for the temperature of each of the heating element of Example 1 and the heating unit of Comparative Example 1 to reach the saturation temperature, according to Test Example 2. Referring to FIG. 5, it can be seen that under the same conditions, the temperature of the heating unit of Example 1 that generates heat by absorption of the electromagnetic waves reaches the saturation temperature faster than that of the heating unit of Comparative Example 1 that generates heat by Joule heating.

TEST EXAMPLE 3

The heating unit including each of the mono- to tetralayered graphene sheets, produced according to the method of Example 1, was prepared with a size of 9 cm×9 cm, and then a microwave oven for electromagnetic wave irradiation was prepared. Next, the temperature of each of the heating units was allowed to reach the saturation temperature by being irradiated with electromagnetic waves at a frequency of 2.45 GHz and an output of 70 W for 10 seconds. Furthermore, the Joule heating element including each of the mono- to tetra-layered graphene sheets, produced in Comparative Example 1, was prepared with a size of 9 cm×9 cm, and the temperature of each of the Joule heating elements was allowed to reach the saturation temperature by supplying a current to the copper electrodes of each of the Joule heating elements at a power of 70 W for 10 seconds to induce the Joule heating of each graphene sheet.

Figure 6:
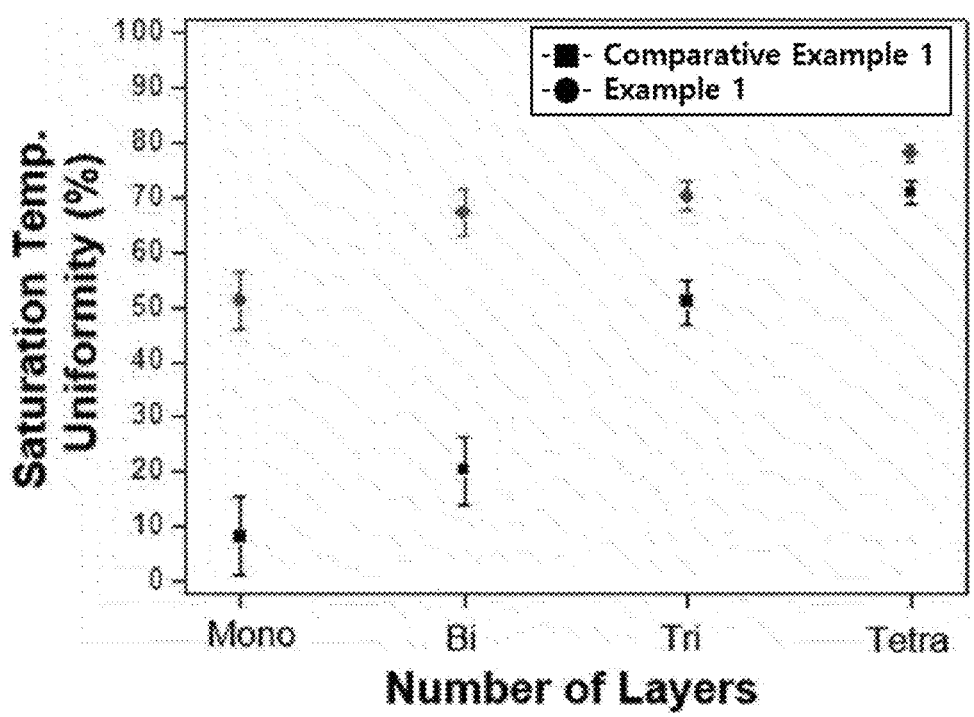
FIG. 6 shows the results of measuring the temperature uniformity of the heating unit of Example 1 and the heating unit of Comparative Example 1 after reaching the saturation temperature, according to Test Example 3.

FIG. 6 shows the results of measuring the temperature uniformity of each of Example 1 and Comparative Example 1 after reaching the saturation temperature, according to Test Example 3. The temperature uniformity after reaching the saturation temperature in FIG. 6 was calculated by quantifying the pixels of images, photographed by a thermal imaging camera, using a Matlab program. Referring to FIG. 6, it can be seen that under the same conditions, the temperature uniformity after reaching the saturation temperature is better in Example 1 that generates heat by electromagnetic wave absorption than in Comparative Example 1 that generates heat by Joule heating.

EXAMPLE 2-1

A p-doped silicon substrate coated with 300 nm-thick $Si_3N_4$ was prepared, treated with a Piranha solution, washed with distilled water, and placed in a reaction flask. Then, 20 ml of toluene solution was added to the reaction flask and 10 mM γ-aminopropyltriethoxysilane (APS) was added thereto. Furthermore, the reaction was performed under an argon gas atmosphere for 2 hours. After completion of the reaction, the substrate was heat-treated at 120° C. for 10 minutes and sonicated for 3 minutes. Then, the substrate was washed to remove the toluene solution, and then dried, thereby producing a substrate having a self-assembled monolayer (SAM) of γ-aminopropyltriethoxysilane (APS) formed thereon.

Furthermore, a heating unit was produced by providing a tetralayered graphene sheet on the substrate according to the method of Example 1, and the same microwave oven for electromagnetic wave irradiation as in Example 1 was prepared.

EXAMPLE 2-2

A heating unit was produced in the same manner as described in Example 2-1, except that a self-assembled monolayer (SAM) of octadecyltrichlorosilane (OTS) was formed using octadecyltrichlorosilane (OTS) instead of γ-aminopropyltriethoxysilane (APS). In addition, the same microwave oven for electromagnetic wave irradiation as in Example 1 was prepared.

TEST EXAMPLE 4

The heating units according to Example 2-1 and Example 2-2, and the heating unit including the tetralayered graphene sheet according to Example 1 were irradiated with electromagnetic waves at an output of 70 W for 10 seconds, and then the temperature distribution of each of the heating units was measured using an infrared camera (FLIR T650sc).

Figure 7:
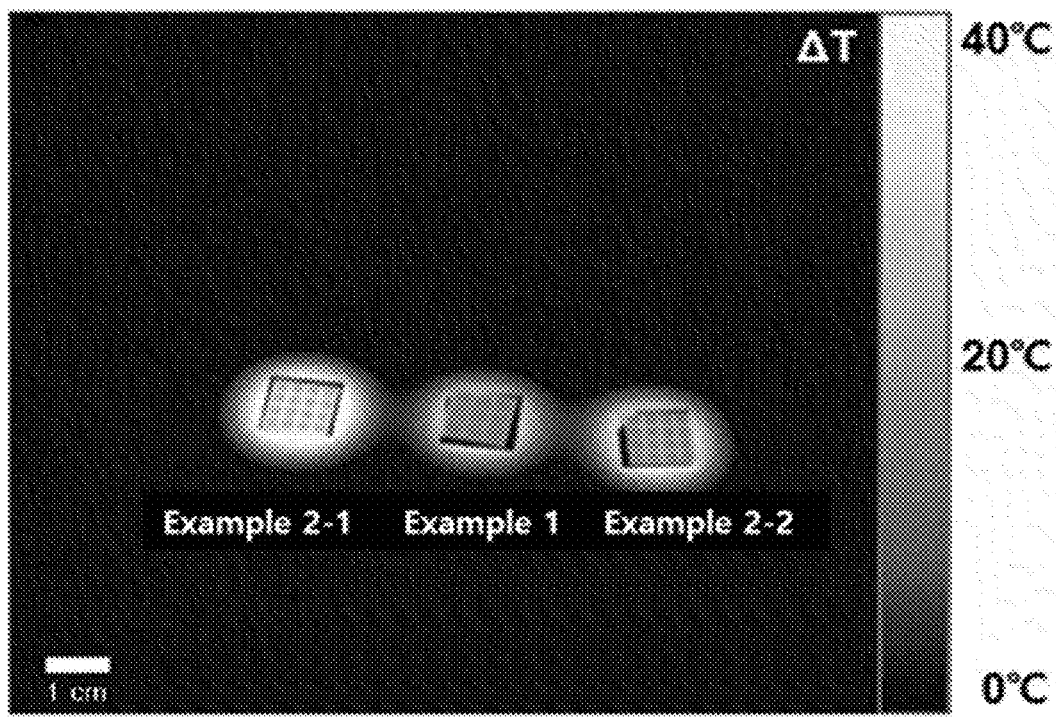
FIG. 7 shows the temperature distribution of each heating unit, measured according to Test Example 4.

FIG. 7 shows the temperature distribution of each heating unit, measured according to Test Example 4. Referring to FIG. 7, it can be seen that the temperature distribution of the heating unit including the self-assembled monolayer of APS or the self-assembled monolayer of OTS differs from that of the heating unit including no self-assembled monolayer. Therefore, it can be seen that heat generation of the heating element may be controlled by using the self-assembled monolayer to control the charge mobility of the graphene sheet.

Figure 8:
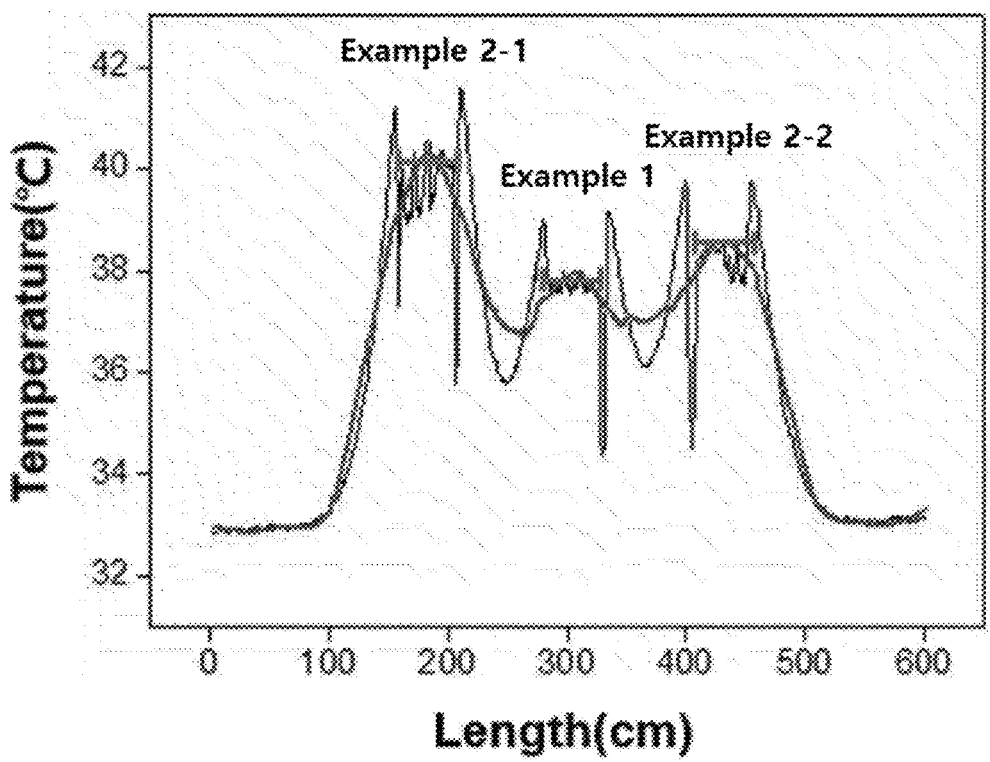
FIG. 8 shows the temperature variation of each of heating elements according to Example 1, Example 2-1 and Example 2-2.

FIG. 8 shows the temperature variation of each of the heating elements according to Example 1, Example 2-1 and Example 2-2. Specifically, the horizontal axis of FIG. 8 denotes the distance resulting from the arrangement of the samples in FIG. 7, and the vertical axis thereof denotes the temperature variation of the sample corresponding to each position. Referring to FIG. 8, it could be seen that the heating unit of Example 1 that includes no self-assembled monolayer generated less heat than the heating unit of Example 2-1 that includes the self-assembled monolayer of APS and the heating unit of Example 2-2 that includes the self-assembled monolayer of OTS, because the charge mobility in the graphene sheet thereof was lower.

TEST EXAMPLE 5

In order to evaluate the effect of the heating system according to the present disclosure, the heating unit including the monolayered graphene sheet according to Example 1 was processed to have a curved surface and affixed to the surface of a glass bottle, and the bottle was frosted by lowering the temperature. Next, the heating unit was irradiated with electromagnetic waves at an output of 70 W for 5 seconds, and then the result was observed. As a control, curved glass including no graphene sheet was affixed to the surface of a glass bottle, and the bottle was frosted in the same manner as described above. The glass bottle was irradiated with electromagnetic waves, and then the result was observed.

Figure 9:
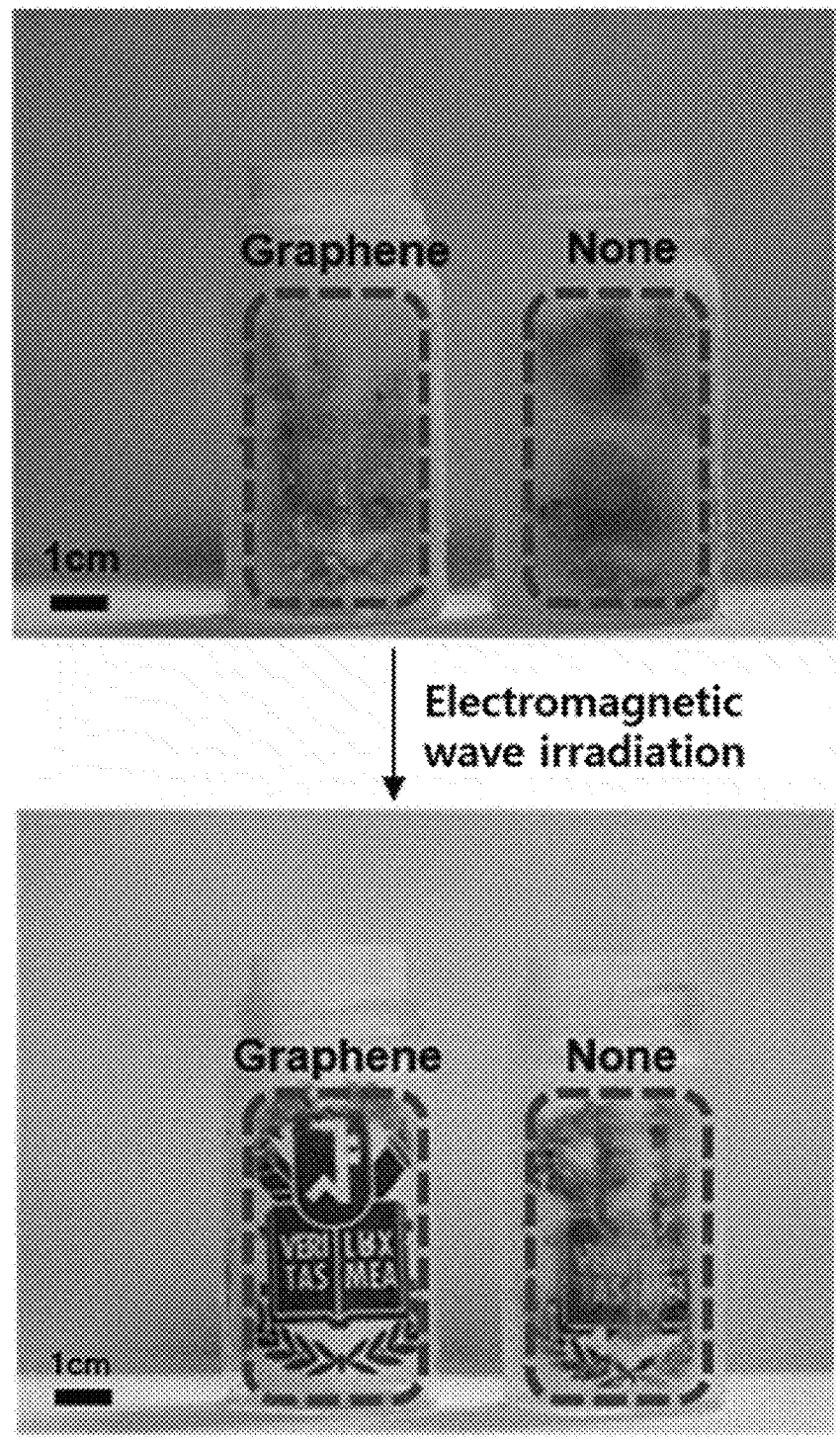
FIG. 9 shows the results of evaluating defrosting effects after electromagnetic wave irradiation according to Test Example 5.

FIG. 9 shows the results of evaluating the defrosting effect after electromagnetic wave irradiation according to Test Example 5. Referring to FIG. 9, it can be seen that the glass bottle affixed with the heating unit including the monolayered graphene sheet according to Example 1 (Graphene) was defrosted, whereas the glass bottle affixed with the substrate including no graphene (None) was not defrosted.

Figure 10:
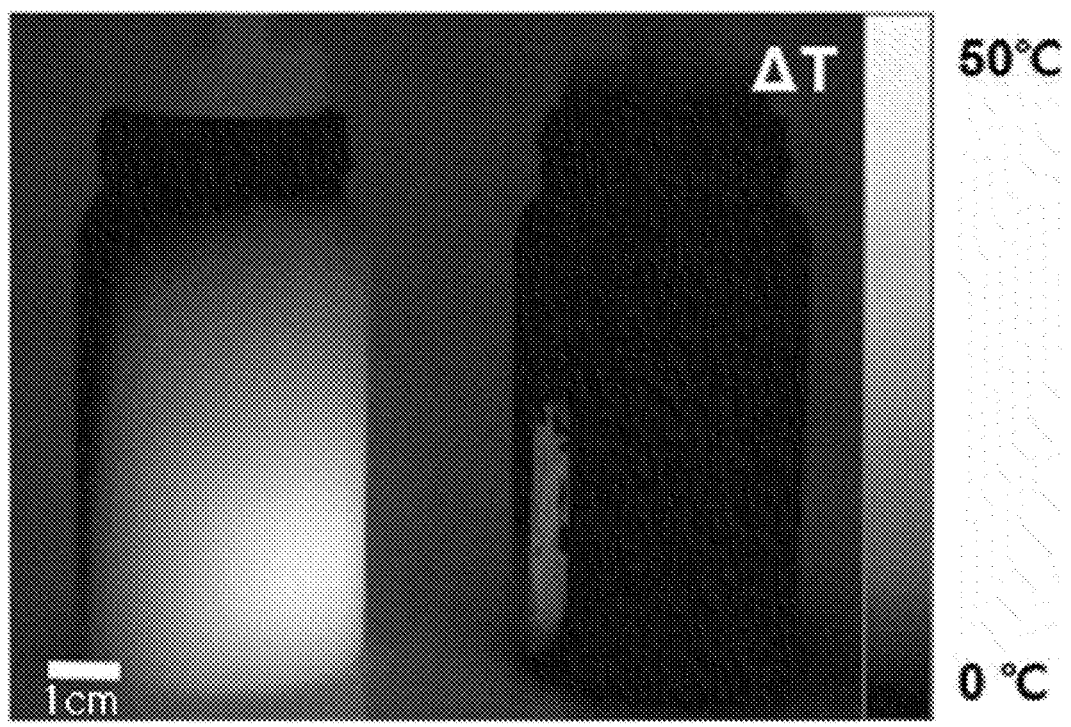
FIG. 10 shows an infrared photograph of glass bottles after electromagnetic wave irradiation according to Test Example 5.

FIG. 10 shows an infrared photograph of the glass bottles after electromagnetic wave irradiation according to Test Example 5. Referring to FIG. 10, it can be seen that the temperature of the left glass bottle affixed with the heating unit including the monolayered graphene sheet according to Example 1 was increased by heat generation, whereas the temperature of the right glass bottle affixed with the substrate including no graphene was not increased by electromagnetic wave irradiation.

The invention claimed is:

1. A heating system comprising:
   a heating unit comprising a substrate and a heating layer provided on the substrate and comprising monolayered graphene sheets having 1 to 10 layers;
   an electromagnetic wave irradiation unit configured to irradiate at least one region of the heating unit with electromagnetic waves; and
   a control unit configured to control an operation of the electromagnetic wave irradiation unit,
   wherein the heating layer emits heat by absorbing the electromagnetic waves, and
   wherein the heating unit comprises no separate electrode.

2. The heating system of claim 1, wherein the heating layer further comprises one or more selected from the group consisting of graphene oxide, reduced graphene oxide, and a graphene flake.

3. The heating system of claim 1, wherein the electromagnetic wave irradiation unit irradiates electromagnetic waves having a frequency of 1 MHz to 100 GHz.

4. The heating system of claim 1, wherein the heating unit further comprises a self-assembled monolayer (SAM) provided between the substrate and the heating layer.

5. The heating system of claim 1, wherein an average light transmittance of the heating unit at a visible wavelength is 80% to 95%.

6. The heating system of claim 1, wherein a temperature uniformity of the heating layer at a saturation temperature is 60% or more.

7. The heating system of claim 1, wherein a time required for a temperature of the heating layer to reach a saturation temperature is within 40 seconds in an area of 9 cm×9 cm.

8. The heating system of claim 1, wherein the heating layer generates heat by charge transport in the graphene in a diamagnetic state, which is induced by absorption of the electromagnetic waves.

9. A heating element comprising:
   a substrate; and
   a heating layer provided on the substrate and comprising monolayered graphene sheets having 1 to 10 layers,
   wherein the heating layer emits heat by absorbing electromagnetic waves, and
   wherein the heating element comprises no separate electrode.

10. The heating element of claim 9, wherein the heating layer further comprises one or more selected from the group consisting of graphene oxide, reduced graphene oxide, and a graphene flake.

11. The heating element of claim 9, wherein the heating element further comprises a self-assembled monolayer (SAM) provided between the substrate and the heating layer.

* * * * *